Aug. 29, 1972      G. J. KILBANE      3,687,705

POWDER SPRAY PROCESS

Filed Sept. 23, 1970

INVENTOR.
GEORGE J. KILBANE
BY Kinney, Alexander,
Sell, Steldt & DeLaHunt
ATTORNEYS 3,687,705
POWDER SPRAY PROCESS
George J. Kilbane, White Bear Lake, Minn., assignor to Minnesota Mining and Manufacturing Company, St. Paul, Minn.
Continuation-in-part of application Ser. No. 812,023, Apr. 1, 1969. This application Sept. 23, 1970, Ser. No. 74,795
Int. Cl. B05b 5/02; B44d 1/094
U.S. Cl. 117—17
15 Claims

ABSTRACT OF THE DISCLOSURE

A process for applying particulate material, generally powdered adhesive, to substrates such as honeycomb core, such process involving spraying electrostatically charged particles through openings in a grounded substrate beyond which is located a backing electrode charged to a potential greater than the potential of the substrate and of a like polarity to the electro-statically charged particulate whereby the particulate is coated on the edges of such openings facing the backing electrode.

---

This is a continuation-in-part of my copending application Ser. No. 812,023, filed Apr. 1, 1969.

This invention relates to a method for applying particles to a substrate, more particularly it relates to a method for applying adhesive in particulate form to substrates, especially open cellular substrates such as honeycomb core structures as are employed in aircraft assemblies.

Powder adhesives represent a unique form of adhesive for bonding honeycomb core structures to metal skins and the like. The advantages of powder over the conventional bonding films employed for this purpose are several including the elimination of a number of hand operations involved in applying films such as removal of protective film liners, positioning of the film on the honeycomb core, and cutting the film to the desired shape. Also the waste inherent in use of films is eliminated, waste occurring not only in the cutting operation, but also in the presence of the film in the intra-cellular spaces where it does not provide any bonding function and yet adds to the weight of the structure. Moreover, film adhesives are not amenable to usage on curved or uneven surfaces. While adhesive in powder form presents the possibility for eliminating all of these disadvantages of films, to date difficulties have been encountered in applying powder adhesive uniformly to the edges of the honeycomb without also coating a substantial portion of the cell walls and the space between the cell walls.

The primary object of the present invention is a process for applying adhesive in particulate form uniformly and substantially exclusively to the aperture edges of apertured structure such as honeycomb core.

Another object is a process suitable for use in assembly line production for applying adhesive in particulate form uniformly and substantially exclusively to such aperture edges.

These and other objects are provided by a process which comprises spraying electrostatically charged particulate through transversely extending apertures in a multi-apertured substrate into the space between the substrate and a backing electrode, said particulate material being sprayed from a source located on one side of said substrate and said backing electrode being located on the opposing side of said substrate and spaced therefrom, said substrate being electrically conductive on at least a portion of the surface defined by the edges of said apertures facing said backing electrode, said backing electrode being at an electrical potential greater than said substrate and of like polarity to said charged particulate material, whereby the particulate material forms a coating on the aperture edges of said substrate defining the conductive portion of the surface of said substrate facing the backing electrode.

In one embodiment of the foregoing, the charged particulate material is sprayed downwardly through apertures of a horizontally disposed substrate into the space between the substrate and a backing electrode aligned with the substrate. In another the charged particulate material is sprayed through the apertures of a vertically disposed substrate into the space between the substrate and a backing electrode aligned with the substrate. Preferably the backing electrode is symmetrical at least with respect to the surface thereof facing the surface of the substrate to be coated. Solid or apertured backing electrodes may be used. The process set-up should be such that the source of the spray is aligned with the substrate and the backing electrode is aligned with the substrate. The optimum distance between the surface of the substrate to be coated and the backing electrode depends upon several factors including the size of the substrate, the configuration of the surface regions to be coated, the size and configuration of the backing electrode, the type of spraying equipment employed, the size of the particulate material, etc. The optimum distance can be readily ascertained for any particular set-up.

The process may be conducted in a non-confined or an enclosed area. The enclosed area reduces spreading or flying of the sprayed particulate material around the area where the spraying is being conducted. The collected powder can be reused. Alternatively, if fly and powder loss is to be prevented, a conventional dust collector or suction device may be located beyond the backup electrode to collect errant, unadhered powder.

The conductivity of the area of the substrate to which the adhesive is to be applied may be due to the construction of the substrate itself or to a treatment to the substrate to render it conductive. Examples of the former are substrates constructed of a conductive material such as a conductive metal at least in the area to which adhesive is to be applied. Copper, aluminum, stainless steel are exemplary conductive materials. Exemplary of non-conductive substrates are those constructed of kraft paper alone or impregnated with a phenolic resin, polyamide paper, and phenolic resin impregnated fiber glass which has been treated with a conductive material in the areas to which the adhesive is to be applied.

A preferred technique in the case of non-conductive substrates is to apply a continuous coating of a conductive composition to the desired substrate areas such as by dipping, brushing, roll coating, or the like. After application, if necessary, the conductive composition can be dried in air or by any other conventional method. The conductive coating must be continuously conductive in the regions to receive the charged particulate material. Any electrical breaks in the circuit will means that particulate material will not be received at the break site. In addition to being continuously conductive, the coating in place should be sufficiently conductive to attract the electrostatically charged particulate material under the conditions of the process of this invention. Coatings which will provide a surface resistivity of $10^9$ ohms per square or less are exemplary of suitable conductive coatings.

Conductivity is preferably achieved by use of conductive particulate material thoroughly intermixed in the coating composition. Suitable conductive particulate material includes conductive carbon black and various metallic powders such as aluminum or iron powders. Vehicles for the conductive particles may be those employed in conventional paints. In addition to providing a site for the electrostatically charged adhesive powders, the conductive coating preferably serves as a primer to improve the ultimate bond strength of the powder adhesive.

To better understand the invention, reference is directed to the accompanying drawings wherein.

Figure 1:
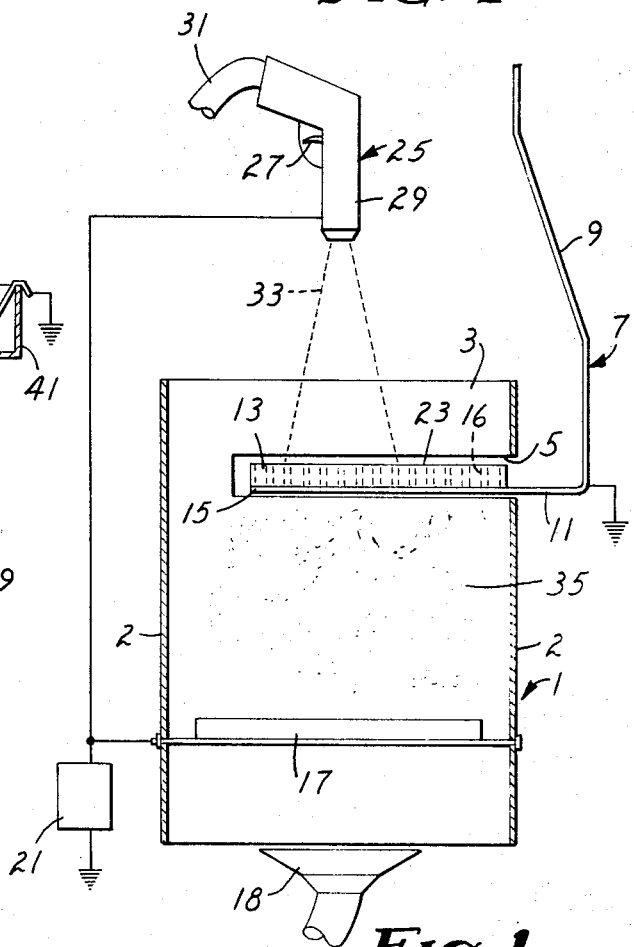
FIG. 1 is a vertical sectional view of equipment positioned for conducting the process of this invention.

Referring to FIG. 1, there is shown a structure 1 having side walls 2, a top opening 3, and a side opening 5. In the side opening 5 passes a conveyor 7 having an arm 9 and a base 11 which is grounded as illustrated. The base 11 is preferably a pair of spaced metal wires suitable for supporting and carrying the substrate 13. The substrate 13, having a multiplicity of transverse openings 15, is also grounded. The substrate 13 is aligned with the opening 3 in container 1. Positioned underneath the substrate 13 and opposing face 15 thereof is an electrode 17 connected to the negative pole of a conventional source 21. Below electrode 17 is a dust collector or suction device 18. Above substrate 13 and opposing face 23 thereof is a conventional electrostatic gun 25 having a trigger 27, barrel 29 pointed toward face 23, and an inlet 31 for conveying particulate material 33 through the gun 25 for electrostatic charging. Gun 25 is also connected to a negatively charged pole of a conventional source 21.

In operation employing the equipment of FIG. 1, the conveyor 7 brings the substrate 13 into alignment with the top opening 3 of structure 1 at which time the trigger 27 is actuated directing electrostatically charged particulate material 33 from barrel 29 in a flat, fan-shaped pattern. The particulate material 33 is smaller than the transverse openings 15 and passes therethrough. The particulate material 33 resists agglomeration due to the repelling effect of like charges. In the space between the substrate 13 and the electrode 17, a dense cloud 35 of particulate material is formed. It is believed that this cloud is created by the opposing forces of air from the gun 25 and repulsion from the like-charged electrode 17, each directed on the particulate material 33. In any event, the result is the deposition of particulate material on the cellular edges of the face 15 of substrate 13 with generally only slight coating of the walls of the transverse openings 15. Suction device 18 collects errant, unadhered particulate material.

Figure 3:
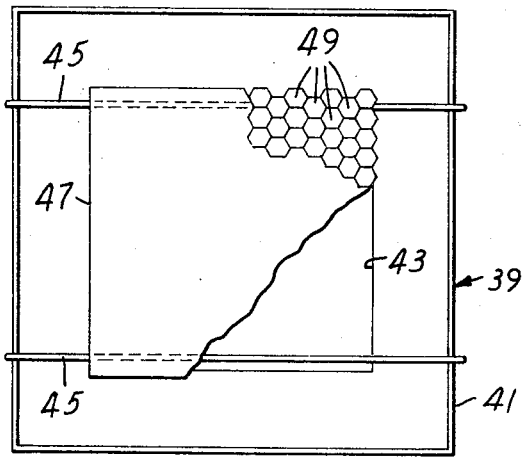
FIG. 3 is a plan view of the embodiment shown in FIG. 2.
Figure 2:
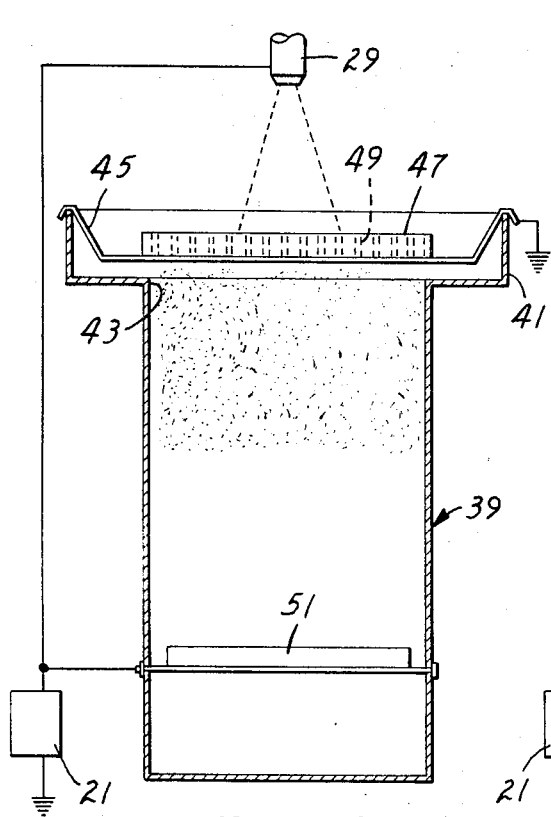
FIG. 2 is a vertical sectional view of equipment positioned for conducting another embodiment of the process of this invention.

FIGS. 2 and 3 illustrate equipment substantially similar to that illustrated in FIG. 1 except that the process employing this equipment is not continuous. Thus, there is a container 39 having an enlarged upper portion 41 having an opening 43. Suspended by wires 45 in upper portion 41 and aligned with opening 43 is a substrate 47 having transverse openings 49. Below substrate 47 is an electrode 51. The various elements are in electrical states similar to the corresponding elements of FIG. 1 and the process, except for being discontinuous, is substantially as described in connection with FIG. 1.

Figure 4:
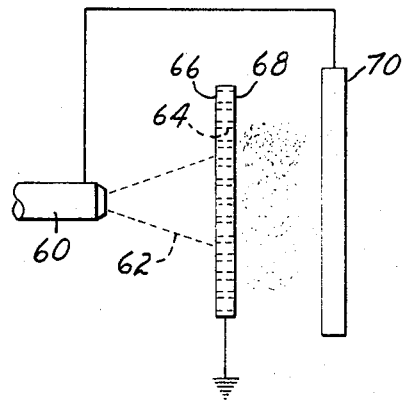
FIG. 4 is a schematic view of another embodiment of this invention.

Referring to FIG. 4, an electrostatic gun 60 discharges electrostatically charged particulate material 62 through apertures 64 in substrate 66. The particulate material 62 enters and forms a cloud in the area between the back face 68 of substrate 66 and apertured electrode 70 charged to a potential of like polarity to that of the particulate material 62. As a result, particulate material deposits on the edges of the apertures along back face 68 of substrate 66.

Adhesives suitable in the practice of this invention are those which have a flowable, particulate character, especially those having a flowable, particulate character at room temperature. Exemplary adhesives include hot melt thermoplastic powders (e.g., polyamides, polyethylene, ethylenevinyl alcohol polymers, polycarbonates), and thermosetting adhesives (epoxy and phenolic resins). Choice of suitable particle size depends on a variety of factors including type and construction of electrostatic spray equipment, spray conditions, the size of the cells or apertures in the substrate being sprayed, the process conditions employed, and many other factors. Particle sizes ranging from 25 to 50 mesh and finer are exemplary, although coarser particles may be used depending on the noted factors.

The potential to which the spray gun and backing electrode are connected must be of the same polarity and greater in absolute magnitude than the potential of the substrate to be coated, which is preferably grounded. Ninety kilovolts (negative) is an exemplary voltage for the spray gun. Negative voltages are highly preferred although positive can be employed. The important fact is that the electrostatically charged particulate material be attracted to the edges of the honeycomb core or similar apertured substrate on the face opposing the backing electrode.

After the adhesive is applied to one or both faces of the substrate, as desired, it can be fused in place by heating in an oven below a curing temperature, or the temperature at which the particulate material cannot be activated for use in bonding.

Further understanding can be gained from the following non-limiting examples.

EXAMPLE 1

Employing the equipment of FIG. 1, a piece of honeycomb (8 in. square) was suspended from a pair of grounded wires about 1½ in. inside the top of a rectangular opentop and bottom box (18 in. square x 24 in. deep) of a conventional cardboard construction. Approximately 12 in. below the honeycomb core piece to be coated was located an electrode composed of an 8 in. x 16 in. x ½ in. aluminum plate connected to a potential source at 90 kilovolts (negative). Approximately 10 inches below this back electrode is a dust collector (Carter-Day Dust Collector, Model RJ). A conventional electrostatic power spray gun with a V-jet nozzle charged at 90 kilovolts (negative) was positioned approximately 6 in. above the honeycomb core to be coated.

The gun was connected to a fluidized bed as a source of aerated powder adhesive (50 mesh and finer). The powder was transported to the gun and discharged therefrom by air pressure (60 p.s.i.) which is supplied to the powder pump located within the fluidized bed. The adhesive was applied by passing the gun back and forth and side to side across the honeycomb core to be coated. This procedure resulted in application of powder to the cellular edges of the underside of the honeycomb core.

EXAMPLE 2

Employing the equipment set-up depicted in FIG. 4, and utilizing the spray equipment of Example 1 the particulate adhesive of Example 1 was applied to the cellular edges of a honeycomb core substrate held vertically at a distance of 4 in. from the nozzle of the spray gun. Beyond the honeycomb core substrate (8 in. square) was a backing electrode of a honeycomb core 8 in. x 16 in. (All honeycomb core employed herein is approximately ⅜ in. thick.) The procedure was conducted in a non-confined area with the electrical potentials and other conditions the same as those of Example 1.

EXAMPLE 3

In this example, a honeycomb core panel constructed of phenolic resin impregnated kraft paper is coated on the cellular edges thereof with the adhesive of Example 1. Prior to such adhesive application, the core panel (20 cm. square and .9 cm. thick) is coated by means of a paint roller with the following conductive compositions:

Name: Amount (grams)
  Epon 1001 [1] _____ 65
  Den 438 [2] _____ 10
  Epon 840 [1] _____ 23
  Durez 16227 resin [3] _____ 5
  TDI-bis urea [4] _____ 8
  Dicyandiamide _____ 3
  Tylac 221A [5] _____ 21
  Strontium chromate _____ 15
  Dimethyl formamide _____ 42
  Methyl alcohol _____ 333
  Acetone _____ 162
  Tetrahydrofuran _____ 405
  Methyl ethyl ketone _____ 19
  Vulcan XC–72 Fluffy [6] _____ 22

[1] Trade name for a bisphenol A epoxy resin.
[2] Trade name for a phenolic resin.
[3] Trade name for a phenolic resin.
[4] Toluene diisocyanate-dimethyl amine adduct.
[5] Trade name for a carboxylated acrylonitrile-butadiene rubber.
[6] Trade name for a conductive carbon black.

The coating, after drying in air for 4 hours and in an oven at 121° C. for 1 hour, is .008 thick and has a resistivity of $2 \times 10^{-5}$ ohms per square.

Employing the equipment set up depicted in FIG. 4 and utilizing the spray equipment of Example 1, the electrostatically charged adhesive of Example 1 is applied to the conductive surface of the honeycomb core held vertically at a distance of approximately 10 cm. from the nozzle of the spray gun. The conductive surface faces away from the electrostatic spray gun. The procedure resulted in a coating of adhesive evenly distributed on the conductively coated cellular edges of the honeycomb core.

EXAMPLE 4

The procedure of Example 3 is employed in all respects except that the substrate is phenolic impregnated fiber glass and the primer having a resistivity of $2 \times 10^3$ ohms per square has the following composition:

Name: Amount (grams)
  Epon 1007 [1] _____ 12
  Ethyl acetate _____ 12
  Durez 16227 [2] _____ 75
  1 hydroxy-2-napthoic acid _____ 1.68
  N-propyl gallate _____ 0.68
  BKS–2710 resin [3] _____ 20
  Methyl ethyl ketone _____ 1812
  Vulcan XC–72 Fluffy [4] _____ 4

[1] Trade name for a bisphenol A-epoxy resin.
[2] Trade name for a phenolic resin.
[3] Trade name for a phenolic resin.
[4] Trade name for a conductive carbon black.

EXAMPLE 5

Example 4 is repeated except that the substrate is coated with an aluminum paint (Sparvac Brand Spray Paint No. S–120 Bright Silver, a trade name of Borden, Inc.).

The process of this invention can be employed to provide coatings of curable adhesive on the aperture edges of multiapertured substrates, especially the substrates having transversely extending, symmetrical cells such as honeycomb core. The source of the adhesive is an electrostatic gun or similar device generally axially aligned with the apertures or cells of the substrate. The backing electrode is generally aligned with the substrate and constructed and situated so as to provide a uniform coating of particulate material to the conductive aperture edges of the substrate which are facing the backing electrode.

The process of this invention affords the opportunity for assembly line application of adhesive to honeycomb core structure and other similar substrates so as to keep pace with the need for assemblies employing such structures, especially in the aircraft industry.

What is claimed is:

1. A process which comprises pneumatically spraying under a first force electrostatically charged dry particulate material through transversely extending apertures in a horizontally disposed multi-apertured substrate into the space between the substrate and a solid backing electrode, said particulate material being sprayed from a source located on one side of said substrate and said backing electrode being located on the opposing side of said substrate and spaced therefrom, said substrate being electrically conductive only at the surface defined by the edges of said apertures facing said backing electrode, said substrate existing in one electrical potential state and said backing electrode being at an electrical potential state greater than said substrate and of like polarity to said charged particulate material, said backing electrode exerting a force opposing said first force, said first force being sufficient in the presence of said opposing force to cause said dry particulate material to deposit substantially exclusively on the aperture edges of said substrate facing the backing electrode whereby the particulate material forms a coating on the aperture edges of said substrate defining the conductive portion of the surface of said substrate facing the backing electrode.

2. The process of claim 1 wherein said conductive portion of said surface is a conductive coating.

3. A process which comprises pneumatically spraying under a first force electrostatically charged dry particulate material through transversely extending apertures in a vertically disposed multi-apertured substrate into the space between the substrate and a backing electrode, said particulate material being sprayed from a source located on one side of said substrate and said backing electrode being located on the opposing side of said substrate and spaced therefrom, said substrate being electrically conductive on at least a portion of the surface defined by the edges of said apertures facing said backing electrode, said substrate existing in one electrical potential state and said backing electrode being at an electrical potential greater than said substrate and of like polarity to said charged particulate material, said backing electrode exerting a force opposing said first force, said first force being sufficient in the presence of said opposing force to cause said particulate material to deposit substantially exclusively on the aperture edges of said substrate facing the backing electrode.

4. The process of claim 3 wherein said conductive portion of said surface is composed of a conductive metal of which said substrate is constructed.

5. The process of claim 3 wherein said conductive portion of said surface is a conductive coating.

6. The process of claim 3 wherein said substrate is non-conductive except for at least a portion of said surface defined by the edges of the apertures facing the backing electrode, which portion bears an electrically conductive coating.

7. A process comprising pneumatically spraying under a first force electrostatically charged dry particulate material downwardly through a plurality of transversely extending apertures in a horizontally disposed, multi-apertured substrate into an enclosed area in which is located a solid backing electrode disposed parallel to said substrate, said substrate being electrically conductive on at least a portion of the surface defined by the edges of said apertures facing said backing electrode, said substrate existing in one electrical potential state and said backing electrode being charged at a potential greater than the potential of said substrate and of like polarity to said charged particulate material, said backing electrode exerting a force opposing said first force, said first force being sufficient in the presence of said opposing force to cause said particulate material to deposit substantially exclusively on the aperture edges of said substrate facing the backing electrode.

8. The process of claim 7 wherein said conductive portion of said surface is composed of a conductive metal of which said substrate is constructed.

9. The process of claim 7 wherein said conductive portion of said surface is a conductive coating.

10. The process of claim 7 wherein said substrate is non-conductive except for at least a portion of said surface defined by the edges of the apertures facing the backing electrode, which portion bears an electrically conductive coating.

11. The process of claim 7 wherein said substrate is at ground potential.

12. A process comprising pneumatically spraying under a first force electrostatically charged dry particulate material through a vertically disposed substrate composed of a plurality of transversely extending apertures into an enclosed area in which is located a backing electrode, said substrate being electrically conductive on at least a portion of the surface defined by the edges of said apertures facing said backing electrode, said substrate existing in one electrical potential state and said backing electrode being charged at a potential greater than the potential of said substrate and of like polarity to said charged particulate material, said backing electrode exerting a force opposing said first force, said first force being sufficient in the presence of said opposing force to cause said dry particulate material to deposit substantially exclusively on the aperture edges of said substrate facing the backing electrode.

13. The process of claim 12 wherein said substrate is at ground potential.

14. The process of claim 12 wherein said conductive portion of said surface is composed of a conductive metal of which said substrate is constructed.

15. The process of claim 12 wherein said conductive portion of said surface is a conductive coating.

References Cited
UNITED STATES PATENTS

| | | | |
|---|---|---|---|
| 2,773,472 | 12/1956 | Lamm | 118—624 |
| 2,902,589 | 9/1959 | Wirta | 161—68 |
| 2,962,403 | 11/1960 | Jones | 161—68 |
| 3,067,507 | 12/1962 | Titus | 161—68 |
| 2,953,483 | 9/1960 | Torok | 118—504 |
| 3,261,707 | 7/1966 | Korski et al. | 118—301 |
| 3,336,903 | 8/1967 | Point | 118—624 |
| 3,513,011 | 5/1970 | Miller | 117—17 |
| 3,576,669 | 4/1971 | Filip | 117—98 |

WILLIAM D. MARTIN, Primary Examiner

M. SOFOCLEOUS, Assistant Examiner

U.S. Cl. X.R.

117—18, 212, 216, 217, 25, 226, 227, 93.4 R, 93.44; 118—621, 622, 624, 628; 161—68

UNITED STATES PATENT OFFICE
CERTIFICATE OF CORRECTION

Patent No. 3,687,705        Dated August 29, 1972

Inventor(s) George J. Kilbane

It is certified that error appears in the above-identified patent and that said Letters Patent are hereby corrected as shown below:

Column 2, line 58, the word "means" should be changed to read --mean--.

Column 5, line 19, the phrase "$^2$ Trade name for a phenolic resin." should be changed to read --2. Trade name for a Novolac epoxy resin.--

Signed and sealed this 29th day of May 1973.

(SEAL)
Attest:

EDWARD M. FLETCHER, JR.        ROBERT GOTTSCHALK
Attesting Officer              Commissioner of Patents